United States Patent

Kotsakis

[15] 3,684,322

[45] Aug. 15, 1972

[54] VIBRATION RESISTANT COUPLING

[72] Inventor: Mike D. Kotsakis, Des Plaines, Ill.

[73] Assignee: Imperial-Eastman Corporation

[22] Filed: Sept. 11, 1970

[21] Appl. No.: 71,543

[52] U.S. Cl. .................285/343, 285/348, 285/382.7
[51] Int. Cl. .............................................F16l 19/08
[58] Field of Search......285/341, 348, 343, 421, 342, 285/382.7, 385, 113; 277/190, 191, 145, 35

[56] References Cited

UNITED STATES PATENTS

| | | | |
|---|---|---|---|
| 3,485,517 | 12/1969 | Howe | 285/348 X |
| 3,207,523 | 9/1965 | Johnson | 277/190 X |
| 3,441,297 | 4/1969 | Koski | 285/348 X |
| 2,448,888 | 9/1948 | Hynes | 285/340 X |
| 3,434,744 | 3/1969 | Yoke et al. | 285/348 X |
| 2,394,351 | 2/1946 | Wurzburger | 285/341 |
| 2,613,086 | 10/1952 | Wolfram | 285/348 X |
| 2,391,900 | 1/1946 | Hobbs | 285/341 |
| 2,931,671 | 4/1960 | Beeley | 285/341 X |

FOREIGN PATENTS OR APPLICATIONS

| | | | |
|---|---|---|---|
| 503,088 | 7/1930 | Germany | 277/35 |
| 831,127 | 3/1960 | Great Britain | 285/341 |
| 551,006 | 2/1943 | Great Britain | 285/343 |
| 21,718 | 11/1893 | Great Britain | 277/145 |
| 1,146,673 | 3/1969 | Great Britain | 285/341 |

*Primary Examiner*—Thomas F. Callaghan
*Attorney*—Hofgren, Wegner, Allen, Stellman & McCord

[57] ABSTRACT

A vibration resistant coupling for use in coupling tubular ducts and the like. The coupling includes a seal structure including a ring formed of an elastomeric material. Within the elastomeric ring is a substantially rigid gripping element and means responsive to an axial compression of the ring to urge the gripping element into gripping association with the outer wall of a tubular duct extended therethrough. The means for constricting the gripping element may comprise wedge means disposed within the elastomeric ring and may include at least one wedge surface on the gripping element. The wedge means is arranged to effectively retain the gripping element in association with the tubular duct notwithstanding a lessening of the compressive force exerted on the gripping element by the elastomeric ring.

21 Claims, 8 Drawing Figures

PATENTED AUG 15 1972 3,684,322

INVENTOR
Mike D. Kotsakis
BY Hofgren, Wegner, Allen, Stellman & McCord
ATTORNEYS

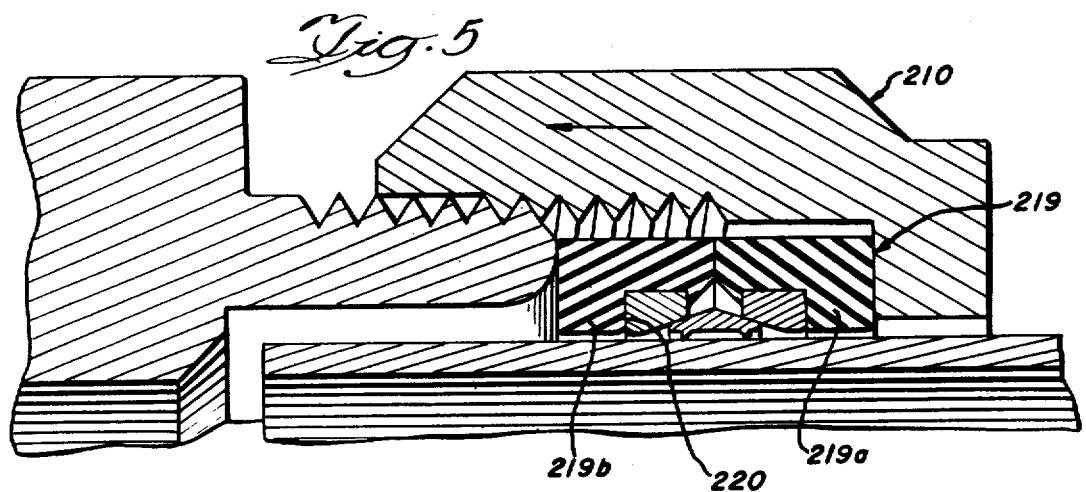
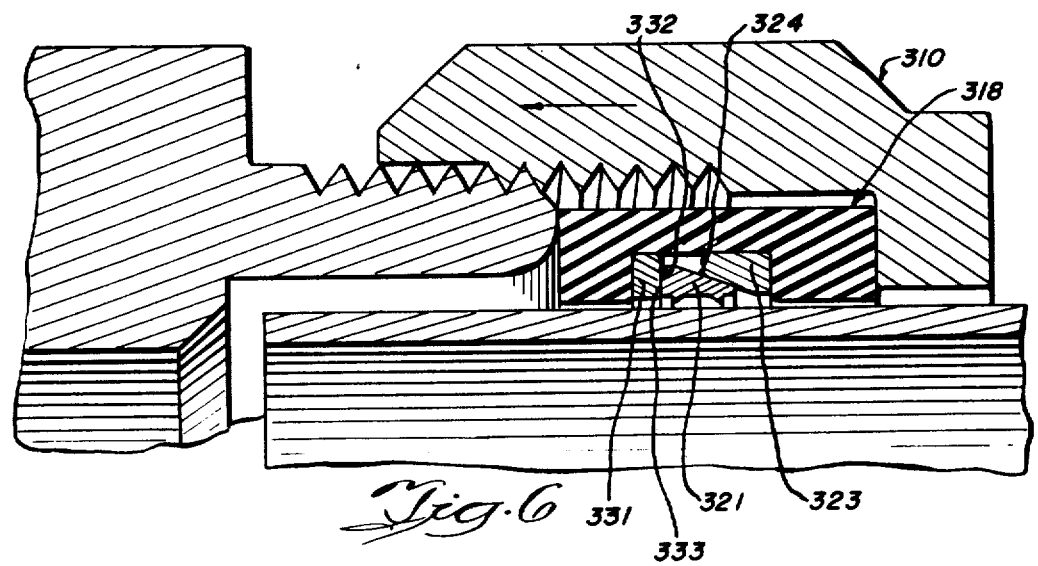
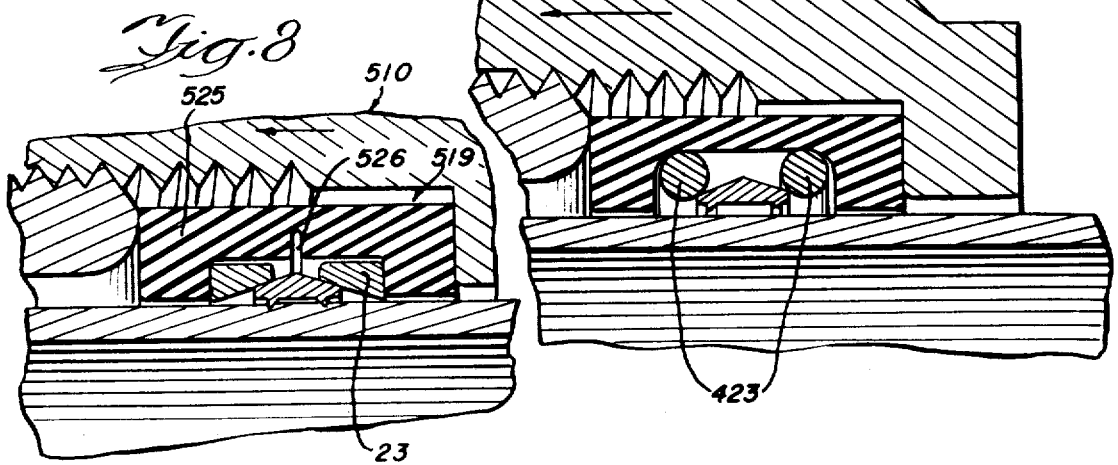

VIBRATION RESISTANT COUPLING

BACKGROUND OF THE INVENTION

1. Field of the Invention

This invention relates to couplings and in particular to couplings for use with tubular ducts.

2. Description of the Prior Art

In couplings for coupling tubular ducts, means are conventionally provided for securing the duct end against axial withdrawal from the coupling. Such means comprise constrictible sleeve elements which are urged into gripping engagement with the duct end as a result of making up of the fitting.

In certain installations, substantial vibration may be present tending to relax the gripping of the duct end with subsequent undesirable release thereof from the coupling.

Another problem encountered at times in the coupling of tubular ducts is the desirability to accommodate some skewing of the axis of the duct relative to the axis of the coupling. To this end, nonrigid, or resilient, gripping elements have been employed.

In such couplings, it is further conventional to provide resilient sealing means caused to effect a seal between the duct end and the coupling elements as a result of making up of the fitting. Many forms of such sealing elements are utilized in the coupling art.

SUMMARY OF THE INVENTION

The present invention comprehends an improved coupling for use with a tubular duct effecting an improved positive retention of the duct end in association with the coupling and a positive sealed connection of the duct end thereto.

More specifically, the invention comprehends providing a coupling having a novel seal structure including a ring formed of elastomeric material and having a radially inwardly opening groove, an annular retainer ring defining a gripping element coaxially within the groove, and means within the groove responsive to a shortening of the axial extent of the ring to urge the gripping element radially inwardly.

The means for urging the gripping element inwardly may comprise wedging means which may include at least one frustoconical surface on the annular gripping element engaged by a cooperating wedging element disposed within the elastomeric ring. The wedging element may comprise an annular member having a corresponding frustoconical wedging surface abutting the wedging surface of the gripping element. The angle of the frustoconical surfaces is preferably preselected to be no greater than the friction locking angle whereby the wedging element effectively positively retains the gripping element in locked association with the duct end. Thus, the gripping element is retained in the fully constricted, or innermost, disposition by the frictional retention thereof notwithstanding a release in the forces produced thereon by the elastomeric ring. Thus, for example, where the ring is formed of rubber, a cold flow, or set, of the rubber after a period of time will not result in a release of the gripping element notwithstanding the release of the constricting forces. Thus, cyclic stress of the duct end is effectively precluded, substantially increasing the life of the coupling and more specifically, increasing the resistance of the duct end to failure at the retainer ring as often occurs in conventional couplings wherein cyclic changes in the gripping action of retaining elements may occur.

Alternatively, the wedging element may comprise an annular element having a circular cross-section in an axial plane.

The gripping element may include a pair of frustoconical surfaces narrowing oppositely outwardly from each other and the end arranged to be engaged by a pair of complementary wedging elements urged forcibly against the wedging surface of the gripping element as a result of the compression of the elastomeric ring. The elastomeric ring may comprise a pair of ring elements cooperatively defining the inwardly opening groove. Alternatively, the ring may comprise a unitary ring. In one form, the ring may have a slit extending partially radially outwardly from the groove.

The gripping element may be provided with a cylindrical radially inner surface. Alternatively, the gripping element may be provided with one or more radially inwardly projecting annular teeth for biting into the duct end in the make-up of the coupling. The gripping element may comprise a split retainer ring.

The resilient ring and the wedging means may be provided with abutting planar surfaces for transmission of axial forces from the resilient ring to the wedging means as a result of the axial compression of the resilient ring during make-up of the coupling. The coupling elements are further constricted to permit a flow of the resilient ring material suitably to accommodate any excessive compressive force exerted thereon so as to further provide an effective limitation on the amount of force applied by the resilient means to the wedging means while yet permitting the outer means to effectively bottom out, or provide a desirable hit-home indication.

The coupling includes outer means for effecting a compression of the elastomeric ring which may include positive limit stop means for limiting the amount of compression applicable to the elastomeric ring in the make-up of the coupling. In the illustrated embodiment, the outer means comprises nut and body members having cooperating shoulders limiting the advance of the nut on the body member to a preselected position whereby the desired control of the compression of the elastomeric means is obtained.

The invention further comprehends providing means associated with the wedge means for limiting the amount of constriction of the retainer ring, or gripping element. More specifically, the wedging means may comprise a pair of gripping elements having opposing surfaces which substantially abut in a limiting position wherein the wedging action of the wedging means effects a preselected maximum constriction of the gripping element. In the preferred embodiment, the maximum constriction of the gripping element permits the duct end to remain substantially unconstricted.

BRIEF DESCRIPTION OF THE DRAWING

Other features and advantages of the invention will be apparent from the following description taken in connection with the accompanying drawing wherein:

FIG. 5 is a fragmentary enlarged diametric section of a further modified form of coupling embodying the invention wherein the resilient ring comprises a pair of annular elements;

FIG. 6 is a fragmentary enlarged diametric section of a still further modified form of coupling embodying the invention wherein the wedge means defines a single pair of frustoconical surfaces and a pair of abutting planar surfaces;

FIG. 7 is a fragmentary enlarged diametric section of a yet further modified form of coupling embodying the invention wherein the wedge means comprises elements having circular cross section in an axial plane; and FIG. 8 is a fragmentary diametric section illustrating a further modified form of coupling embodying the invention wherein the resilient ring is provided with a slit extending radially outwardly therethrough.

DESCRIPTION OF THE PREFERRED EMBODIMENTS

Figure 2:
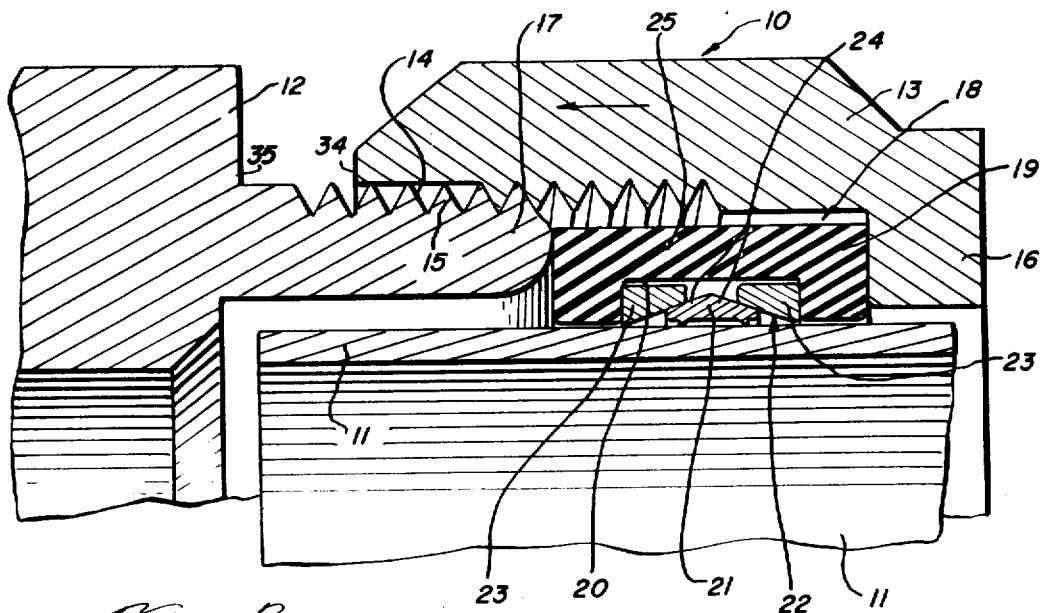
FIG. 2 is a fragmentary enlarged diametric section of the structure of FIG. 1 with the coupling as arranged at the beginning of making up thereof.
Figure 3:
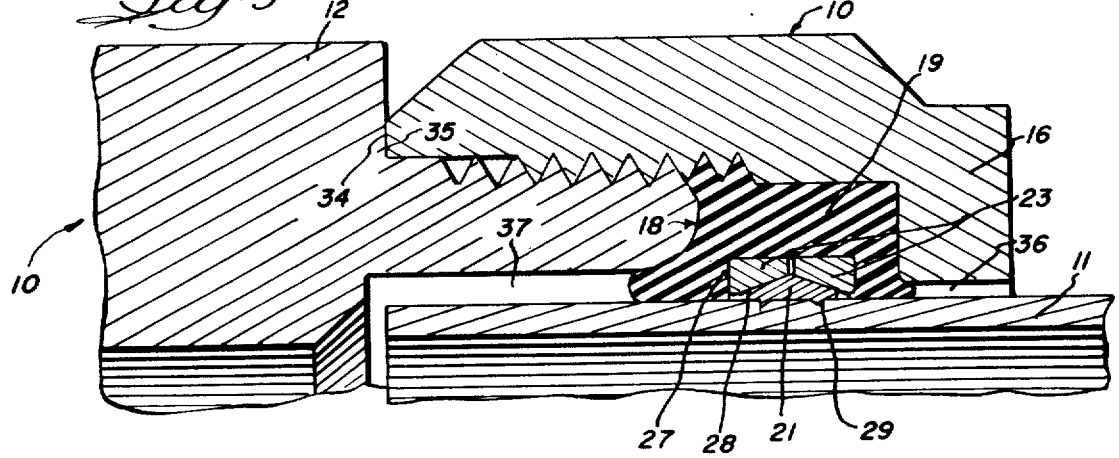
FIG. 3 is a fragmentary enlarged diametric section similar to that of FIG. 2 but with the coupling elements as arranged upon completion of make-up thereof.
Figure 1:
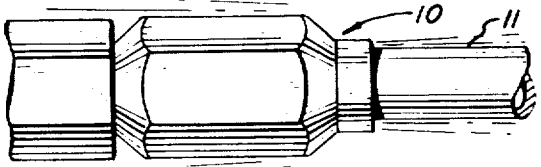
FIG. 1 is a fragmentary front elevation of a coupling embodying the invention having a tubular duct end associated therewith.

In the exemplary embodiment of the invention as disclosed in FIGS. 1–3 of the drawing, a coupling generally designated 10 for use in coupling the end 11 of a tubular duct is shown to comprise a body member 12 and a nut member 13 defining an outer encircling structure of the coupling. Body 12 and nut 13 are provided with cooperating thread means 14 and 15 respectively, for adjustably spacing an inturned end flange 16 of the nut from an inner end cam portion 17 of the body as an incident of threading of the nut onto the body thread 14.

Duct end 11 is sealingly retained in association with coupling 10 by means of a seal structure generally designated 18. As shown in FIG. 2, seal structure 18 includes a sealing and force transmitting ring 19 formed of elastomeric material and having a radially inwardly opening groove 20. Received within groove 20 is a gripping element, or retainer ring, 21 and wedging means generally designated 22. In the specific embodiment of coupling 10, the wedging means includes a pair of wedge rings 23 at axially opposite sides of the retainer ring 21. Wedging means 22 further includes a wedging surface 24 provided on the retainer ring 21 for cooperation with a wedging element 23 and in the illustrated embodiment, a pair of frustoconical surfaces 24 are provided on the retainer ring narrowing axially away from each other.

As shown in FIGS. 2 and 3, the bight portion 25 of ring 19 may comprise a tubular portion having an unconstricted outer diameter slightly less than the inner diameter of nut portion 15 and an inner diameter slightly greater than the outer diameter of wedge rings 23. As shown in FIG. 8, the bight portion 525 of the U-shaped resilient ring 519 may be provided with a slit 526 extending partially radially outwardly therethrough to facilitate installation of the wedging elements and gripping element therein as well as facilitate axial compression and movement of the wedging elements 23 axially towards each other to a final juxtaposed disposition in the made-up arrangement of the coupling.

Each of the wedge elements 23 may be provided with a planar end surface 27 and a frustoconical radially inwardly facing wedging surface 28 complementary to the frustoconical wedging surfaces 24 of the retainer ring. Wedging elements 23 may comprise rigid rings formed of a material such as metal and retainer ring 21 may comprise a split metal ring adapted to be constricted by wedging elements 23 in climbing onto surfaces 24 during make-up of the coupling. As shown in FIG. 3, the retainer ring may be provided with at least one annular radially inwardly projecting tooth 29 biting into the outer surface of the wall of duct end 11 in the made-up arrangement of the coupling. In the made-up arrangement, the wedge elements 23 may be substantially in abutment with each other to provide a hit-home indication as a result in a sudden increase in the resistance of the coupling to torquing.

Coupling 10 further defines a plurality of different control structures providing improved facilitated proper make-up of the fitting with minimum effort while yet assuring long, positive coupling of the duct end notwithstanding forces acting thereon tending to break the connection. More specifically, as best seen in FIGS. 2 and 3, nut member 13 may be provided with an inner end surface 34 confronting an outer end surface 35 on body member 12 which are brought into abutment in the made-up arrangement of the fitting as seen in FIG. 3 to provide a positive hit-home indication of the completion of the assembly. In the fully made-up disposition of the coupling, sufficient force has been transmitted through resilient ring 19 to urge wedging elements 23 axially together to a final disposition as shown in FIG. 3 wherein the wedging elements effectively abut each other to limit the radial constriction of the retainer ring gripping element 21. The constriction thusly obtained is preselected to assure that the teeth 29 penetrate the wall of duct end 11 to the full radial extent of the teeth to provide effectively maximized mechanical retention of the ring 21 against withdrawal of the duct end 11 axially therefrom. The constriction of ring 21 is further preselected to effectively preclude collapse of duct end 11 thereat to further maximize the strength of the coupling connection.

As seen in FIG. 3, the elastomeric ring material tends to flow through the tubular spaces 36 and 37 between duct end 11 and nut flange 16 at the outer end of the coupling and between duct end 11 and body member 12 at the inner end of the coupling, thereby to provide control over the maximum compressive force generated by the resilient ring on the wedging elements. Thus, manufacturing tolerances on the nut and body dimensions are not extreme as the permissible rubber deformation into spaces 36 and 37 provides a control over the transmission of forces to the gripping element from the threaded advancement of the nut on the body. Ring 19 provides a seal between the duct end 11 and the body member 12. A secondary seal may be effected between the nut member and the duct end similarly by ring 19 for further improved performance of the seal structure defined by the elastomeric ring retainer element and wedging means.

Retainer ring 21 is effectively positively retained in its innermost constricted disposition by a locking action developed between the wedge rings 23 and the retainer ring 21 to effectively avoid cyclic stresses in the duct end. More specifically, the invention comprehends providing surfaces 24 and 28 at an angle preselected to be no greater than the friction locking angle whereby wedging elements 23 are frictionally locked in the constricting disposition of FIG. 3 upon completion of the make-up of the coupling. Thus, should the resilient ring 19 cold flow, or otherwise relax the compressive force thereof acting on wedging elements 23, the wedging elements do not move outwardly to relax their constricting effect on the gripping element, but rather, positively maintain the gripping element in the duct end gripping disposition of FIG. 3. Illustratively, where the elements 21 and 23 are formed of steel, the angle of surfaces 24 and 28 may be approximately 24° to the axis of the coupling. As will be obvious to those skilled in the art, the friction locking angle, i.e., an angle whose tangent is equal to the coefficient of friction of the confronting surfaces, may vary as a function of a number of parameters such as the material of which the elements are formed, the surface conditions thereof such as oxidation, contamination, presence of lubricant, etc.

Thus, in making up of coupling 10, the user firstly installs the wedging elements 23 and retainer ring 21 in groove 20 of the resilient ring 19, as shown in FIG. 2. The preassembled seal structure 18 is then installed within the nut 13 whereupon the nut may be threaded onto the body member thread 14 as shown in FIG. 2 to compress the seal structure 18 between flange 16 and body cam portion 17. As the resilient ring 19 is compressed, it transfers axial force to each of the wedge elements 23 through the planar outer surfaces 27 to move the wedge elements 23 axially onto frustoconical surfaces 24 of retainer ring 21 thereby constricting the retainer ring. The constriction of retainer ring 21 is continued until surfaces 34 and 35 abut, at which point, wedging elements 23 are brought into substantial abutment and teeth 29 are substantially fully embedded in the wall of duct end 11. At this time, resilient ring 19 has been deformed to substantially completely fill the space within nut 13 and sealingly engage the outer surface of the duct end about retainer ring 21 and wedging means 22, as shown in FIG. 3. As retainer ring 21 is positively retained on the duct end and resiliently associated with the coupling elements 12 and 13 through the medium of the resilient ring 19 therebetween, a positive high flexure, vibration resistant coupling is provided wherein the duct end is effectively maintained sealed to body member 12 and retained against pullout, or axially outward displacement, from the coupling notwithstanding such vibration and other forces tending to urge the duct end outwardly therefrom. Further, as the retainer ring is effectively carried within the resilient ring 19, the duct end 11 may have a skewed relationship to body 12 while yet a positive sealed connection therebetween may be effected by means of seal structure 18.

Illustratively, a nominal 1½ inches coupling made in conformity with the coupling corresponding to the disclosed coupling 10 has been found to have a burst strength of approximately 13,000 psi. Because of the vibration resistant characteristics of seal structure 18, a much lower ratio of the normal rating to the burst strength may be utilized. Thus, illustratively, a nominal rating of approximately 3,250 psi may be utilized with the indicated 1½ inches coupling whereas in conventional couplings, a rating of under 1,500 psi would be conventionally applied.

A further feature of the seal structure 18 is the adaptability for use thereof with conventional couplings utilizing nut and body members generally similar to nut and body members 13 and 12 of coupling 10.

In the illustrated embodiment, teeth 29 may be disposed as desired at any portion axially of the retainer ring and may comprise asymmetrical teeth wherein the outer surface may be at an angle of approx. 75° to the axis of the coupling and the inner surface may be at an angle of approx. 45° thereto.

Figure 4:
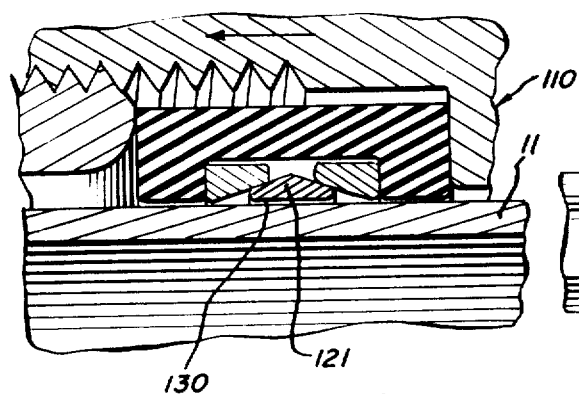
FIG. 4 is a fragmentary diametric section illustrating a modified form of coupling embodying the invention wherein the gripping element is provided with a substantially cylindrical radially inner surface.

Referring now to the embodiment of FIG. 4, a modified form of coupling generally designated 110 is shown to comprise a coupling generally similar to coupling 10 but having a modified form of retainer ring generally designated 121 provided with a cylindrical radially inner surface 130 free of radial inward projections such as teeth 29 whereby the retainer ring retains the duct end 11 with a frictional grip.

In FIG. 5, a further modified form of coupling generally designated 210 is shown to comprise a coupling generally similar to coupling 10 but wherein the annular resilient ring 219 comprises a split ring effectively defined by a pair of resilient ring elements 219a and 219b cooperatively defining the radially inwardly opening groove 220.

In FIG. 6, a still further modified form of coupling embodying the invention generally designated 310 is shown to comprise a coupling generally similar to coupling 10 but having a seal structure generally designated 318 wherein the retainer ring 321 is provided with a single frustoconical surface 324. A single wedge element 323 is provided for wedging coaction with a wedge surface 324 and a rigid back-up ring 331 is provided with a planar surface 332 abutting a planar end surface 333 of the modified retainer ring 321.

As shown in FIG. 7, a still further modified coupling 410 is similar to coupling 10 except that the wedging elements 423 comprise metal rings having circular cross-sections in an axial plane, i.e. a plane of the axis of the coupling and of the annular extent of rings 423.

The modification of FIG. 8 as discussed above comprises a coupling 510 similar to coupling 10 except having slit 526 provided therein to facilitate make-up of the coupling.

Each of the couplings 110, 210, 310, 410 and 510 is similar to and functions similar to coupling 10 except as otherwise noted above. Elements of couplings 110, 210, 310, 410 and 510 similar to corresponding elements of coupling 10 are identified by similar reference numbers, but respectively 100 higher. The various modifications of couplings 110, 210, 310, 410 and 510 are exemplary of modifications of the broad structural concepts which may be embodied in the invention.

The foregoing disclosure of specific embodiments is illustrative of the broad inventive concepts comprehended by the invention.

I claim:

1. A coupling for use with a tubular duct, comprising: a contractible retainer ring having an original inner diameter at least substantially equal to the outer diameter of the duct to be coupled and an outer surface; rigid ring-like wedge means wedgedly engaging said outer surface of said retainer ring and having axially opposite end portions and a radially outer external surface, said wedge means comprising means for contracting said retainer ring grippingly about the duct as the result of application of opposing forces acting against said opposite end portions; and outer means for adjustably enclosing said associated retainer ring and wedge means and having resilient means surrounding said opposite end portions and the entire said external surface of said wedge means and extending into engagement with the duct in the made-up arrangement of the coupling, said resilient means being arranged to resiliently apply opposing forces to said wedge means end portions for contracting said retainer ring as a result of adjustment of said outer means.

2. The coupling of claim 1 wherein said resilient means comprises a ring coaxially of said retainer ring and defining a radially inwardly opening annular groove receiving said associated retainer ring and wedge means.

3. The coupling of claim 1 wherein said retainer outer surface comprises an outwardly inclined frustoconical surface and said wedge means comprises a wedge ring having a complementary inwardly inclined frustoconical surface facially engaging said retainer ring inclined surface.

4. The coupling of claim 1 wherein said wedge means comprises a pair of rigid rings one each at opposite axial ends of said retainer ring, said retainer ring outer surface comprising an outwardly inclined frustoconical surface, one rigid ring bearing against said outwardly inclined surface.

5. The coupling of claim 1 wherein said wedge means comprises a pair of rigid rings one each at opposite axial ends of said retainer ring, said retainer ring outer surface being defined by a pair of axially oppositely, outwardly inclined frustoconical surfaces, one of said rigid rings engaging one of said inclined retainer ring inclined surfaces and the other of said rigid elements engaging the other of said inclined retainer ring inclined surfaces.

6. The coupling of claim 1 wherein said retainer ring outer surface comprises a frustoconical surface and said wedge means comprises an annular element coaxially engaging said frustoconical surface.

7. The coupling of claim 6 wherein said annular element has a circular cross section in a plane of the axis of annularity thereof.

8. The coupling of claim 6 wherein said annular element has a frustoconical surface facially engaging said retainer ring frustoconical surface.

9. The coupling of claim 1 wherein said retainer ring includes a planar end surface and said wedge means includes a back-up element having an end surface engaging said planar surface.

10. The coupling of claim 9 wherein said back-up element end surface is planar and facially engages said retainer ring planar surface.

11. The coupling of claim 1 wherein said resilient means comprises a pair of coaxial annular elements cooperatively defining a radially inwardly opening groove, said associated retainer ring and wedge means being disposed in said groove.

12. The coupling of claim 1 wherein said resilient means comprises an annular member having a radially inwardly opening U-shaped cross-section in an axial plane.

13. The coupling of claim 12 wherein said annular member defines a bight portion having a split extending radially partially through the radial thickness thereof.

14. The coupling of claim 1 wherein said retainer ring is provided with a substantially annular tooth projecting radially inwardly therefrom to bite into the tubular duct in the made-up arrangement of the coupling.

15. The coupling of claim 1 wherein said wedge means and resilient means have planar surfaces abutting each other for transferring an axial force from the resilient means to the wedge means suitable to urge said wedge means against the retainer ring to contract the retainer ring into positive gripping engagement with the tubular duct.

16. The coupling of claim 1 wherein said retainer ring outer surface comprises an outwardly inclined surface and said wedge means comprises an element having a complementary inwardly inclined surface facially engaging said retainer ring inclined surface, said surfaces being at an angle preselected to be no greater than the friction locking angle whereby said wedge element locks said retainer ring in an innermost contracted disposition.

17. The coupling of claim 1 wherein said outer means is provided with means for positively limiting the amount of force applied by said resilient means to said wedge means.

18. The coupling of claim 1 wherein said wedge means comprises a pair of apposed ring-like wedge elements provided with means for limiting the contraction of said retainer ring effected by said wedge means.

19. The coupling of claim 16 wherein said wedge means and said retainer ring are formed of steel and said wedge inclined surfaces are at an angle to the axis thereof of no greater than approximately 24° whereby said wedging element locks said retainer element in a radially inwardly constricted disposition.

20. The seal structure of claim 1 wherein said wedge means comprises a plurality of rigid rings.

21. The seal structure of claim 1 wherein said retainer ring is formed of metal.

* * * * *